United States Patent
Kettenberger et al.

(10) Patent No.: US 8,360,452 B2
(45) Date of Patent: Jan. 29, 2013

(54) VEHICLE SUSPENSION INCLUDING A LINK

(75) Inventors: Johann Kettenberger, Winhoering (DE); Norbert Seyr, Munich (DE); Andreas Obieglo, Greer, SC (US); John Ziegert, Seneca, SC (US); Beshah Ayalew, Greer, SC (US); Vincent Lee, Greenville, SC (US); Souharda Raghavendra, Clemson, SC (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 495 days.

(21) Appl. No.: 12/542,180

(22) Filed: Aug. 17, 2009

(65) Prior Publication Data

US 2010/0038875 A1 Feb. 18, 2010

Related U.S. Application Data

(60) Provisional application No. 61/136,168, filed on Aug. 15, 2008.

(51) Int. Cl.
*B60G 11/06* (2006.01)
*B60G 3/10* (2006.01)
*B60G 3/28* (2006.01)

(52) U.S. Cl. ........ 280/124.175; 280/124.71; 280/124.14

(58) Field of Classification Search ........... 280/124.116, 280/124.175, 124.171, 124.17, 124.163, 280/124.134, 124.135, 124.136, 124.14
See application file for complete search history.

(56) References Cited

U.S. PATENT DOCUMENTS

| | | | | |
|---|---|---|---|---|
| 1,452,017 A | * | 4/1923 | Allen | 267/192 |
| 1,585,097 A | * | 5/1926 | Holle | 280/124.171 |
| 2,149,895 A | * | 3/1939 | Maruhn | 267/36.1 |
| 3,426,862 A | * | 2/1969 | Wilfert | 180/362 |
| 7,484,745 B2 | * | 2/2009 | Soles et al. | 280/124.116 |
| 2004/0090032 A1 | | 5/2004 | Raleigh et al. | |

FOREIGN PATENT DOCUMENTS

| | | |
|---|---|---|
| DE | 43 34 369 A1 | 4/1995 |
| DE | 195 24 106 A1 | 1/1996 |
| JP | 11-208233 A | 8/1999 |
| JP | 2005-112098 A | 4/2005 |

OTHER PUBLICATIONS

German Search Report dated Mar. 17, 2010 including English-language translation (Nine (9) pages).

* cited by examiner

*Primary Examiner* — Drew Brown
(74) *Attorney, Agent, or Firm* — Crowell & Moring LLP

(57) ABSTRACT

A link of a vehicle suspension is elastic and includes three suspension points. A first point is adapted to be pivotally connected to a wheel carrier of the corresponding vehicle. A second point is adapted to be pivotally connected to a rigid chassis of the corresponding vehicle. The third point is adapted to be pivotally connected to a shackle, the shackle pivotally connecting the third point to the rigid chassis of the vehicle.

20 Claims, 4 Drawing Sheets

VEHICLE SUSPENSION INCLUDING A LINK

CROSS-REFERENCE TO RELATED APPLICATION

This application claims the benefit under 35 U.S.C. § 119(e) of Provisional Application No. 61/136,168, filed Aug. 15, 2008, the contents of which are herein expressly incorporated by reference.

BACKGROUND AND SUMMARY OF THE INVENTION

The invention relates to a link of a vehicle suspension and to a vehicle suspension including such a link.

Known vehicle suspensions include a number of components taking over the functions of guiding the corresponding wheel motion and storing energy introduced in the suspension because of the motion of the wheel.

In known vehicle suspensions, the functions of guiding the wheel motion and storing energy are often separated in several elements of the vehicle suspension. The consequence is a large number of elements bringing about high manufacturing costs, high mass, and sometimes packaging problems.

According to the invention, a link of a vehicle suspension is provided, the link being elastic and including three suspension points, a first point being adapted to be pivotally connected to a wheel carrier of the corresponding vehicle, a second point being adapted to be pivotally connected to a rigid chassis of the corresponding vehicle, and the third point being adapted to be pivotally connected to a shackle, the shackle pivotally connecting the third point to the rigid chassis.

According to the invention, a member of the suspension is replaced with a composite compliant member or link. The compliant or elastic member of the invention combines the functions of guiding the corresponding wheel and of elastically suspending the wheel. Thereby, the link may replace a guiding link and a conventional coil spring.

In a first preferred embodiment of the link, the link is an elongated leaf element, the first point being located at a first end of the elongated leaf element, the second point being located somewhere on the longitudinal extent of the elongated leaf element, and the third point being located at the second end of the elongated leaf element. This preferred link may replace a link element or control arm of known suspensions. In particular, the link according to the invention is used as an upper transverse or lateral control arm in an independent suspension of an automobile. Further, the link is advantageously used in a rear suspension of an automobile.

In a second preferred embodiment of the link, the first, second and third points each have a fixed position at the link. The fixed positions of the pivot points clearly define the degrees of freedom for guiding the wheel during its movement.

Further, according to the invention, a vehicle suspension is provided including at least one link, a wheel carrier, a rigid chassis and a shackle, the link being elastic and including three suspension points, a first point being pivotally connected to the wheel carrier, a second point being pivotally connected to the rigid chassis, and the third point being pivotally connected to the shackle, the shackle pivotally connecting the third point to the rigid chassis.

In a first preferred embodiment of the vehicle suspension, the link is an elongated leaf element, the first point being located at a first end of the elongated leaf element, the second point being located somewhere on the longitudinal extent of the elongated leaf element, and the third point being located at the second end of the elongated leaf element. The link thereby works as a compliant link with an intermediate fulcrum point connected to the chassis.

Correspondingly, in a second preferred embodiment of the vehicle suspension, the first, second and third points each have a fixed position at the link. Accordingly, a constrained link guiding the wheel carrier relative to the chassis is provided.

In a third preferred embodiment of the vehicle suspension, the suspension includes a second link, the second link being pivotally connected at one of its ends to the wheel carrier, and being pivotally connected at its second end to the rigid chassis. In particular, the second link advantageously is rigid and is the lower arm of a respective parallelogram, the parallelogram guiding the wheel carrier relative to the chassis. In addition, this link according to the invention is advantageously the upper lateral arm of the parallelogram. Furthermore, it is also preferred to replace the lower arm with a similarly constrained compliant link.

Accordingly, in a forth preferred embodiment of the vehicle suspension, the links are part of a parallelogram guiding the wheel carrier relative to the chassis, the elastic link being the upper lateral arm of the parallelogram, and the second link being rigid and being the lower arm of the parallelogram. In one embodiment of such a vehicle suspension, the elastic link replaces the suspension's upper arm and coil spring with a single, ternary supported compliant link. The ternary link is thereby defined as a link with three pin-joint connections to it. The link is pin-joined to the wheel carrier at the one end, and pin-joined to the chassis at the fulcrum. The other end of the link is pin-joined to the shackle attached to the chassis. The shackle allows for effective length changes of the elastic link as it bends. The distance from the fulcrum to the wheel carrier joint primarily affects the kinematic behavior of the wheel during bounce and rebound of the link, while the entire length of the elastic link is available for energy storage in the form of elastic strain energy in bending.

In a fifth preferred embodiment of the vehicle suspension, the second point includes two bumps fixed at the link, at least one suspension element holding the link by carrying it between the two bumps.

In an alternative sixth preferred embodiment of the vehicle suspension, the second point includes one single bump being fixed at the link, at least one suspension element holding the link by encompassing the bump.

In an alternative seventh preferred embodiment of the vehicle suspension, the second point includes at least one suspension element, the suspension element clamping the link.

Finally, in an eighth preferred embodiment of the vehicle suspension, a fixation of the second point at the rigid chassis is provided, the fixation being displaceable at the rigid chassis.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
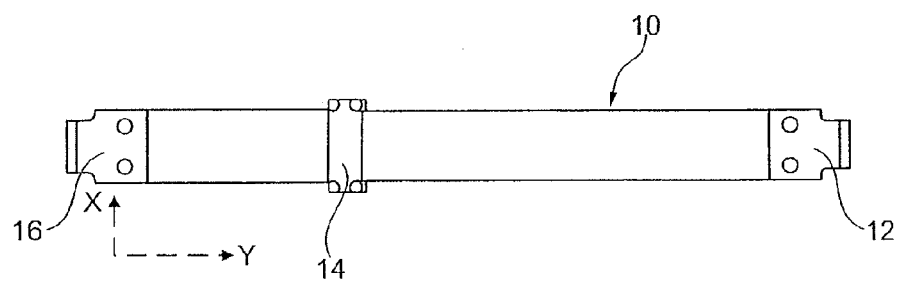
FIG. 1 is a top view of an embodiment of a link of a vehicle suspension according to the invention.
Figure 2:
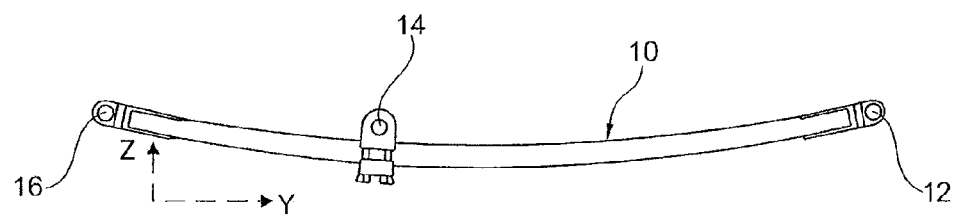
FIG. 2 is a front view of the link according to FIG. 1.
Figure 3:
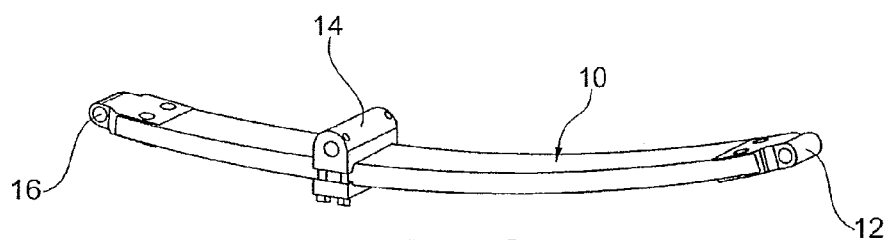
FIG. 3 is a perspective view of the link according to FIG. 1.

In FIGS. 1 to 3, a schematic layout of a so called "ternary" compliant link 10 is depicted. The link 10 is designed in the form of an elongated leaf element, which is elongated in the Y-direction, and which is elastic in the Z-direction (perpendicular, vertical direction), while being rigid in the X-direction (at right angle to the Z-direction).

The "ternary" compliant link 10 is a "simple" link with there being three connections or suspension points 12, 14 and 16 to it, allowing the link 10 to be loaded in bending. The suspension point 12 is at a first end of the link 10 and connects the link 10 to a 20 wheel carrier 18 (referring to FIGS. 4 and 5). The suspension point 14 is located somewhere on the longitudinal extent of the link 10, in particular at its fulcrum location, and is pivoted to a chassis 20. The suspension point 16 is located at the second end of the link 10, and pivotally connects the link 10 to a shackle 22. The shackle 22 is essentially a short vertical link which constrains the motion of suspension point 16 in the vertical direction while allowing small motions in the horizontal direction.

The intermediate pivot point, or fulcrum, on the compliant link 10 can be designed such that the distance from the fulcrum to the suspension point 12 on the wheel carrier 18 provides the desired kinematic motion of the wheel 28. The additional length of the link from the fulcrum to the suspension point 16 stores the elastic energy over a greater length and allows greater range of wheel motion without exceeding stress constraints. Thus, the compliant link 10 allows the use of short effective link lengths which may be necessary for optimal wheel kinematics, while still providing a long beam to allow large vertical wheel travel without overstressing the beam.

The compliant link 10 according to the shown embodiment uses a composite material instead of a conventional multi-leaf steel spring, saving substantial weight. However, metal compliant links may also be used if desired. The desired stiffness of the suspension can be achieved by suitable modifications to the width, thickness and initial curvature of the compliant link 10. The thickness of the compliant link 10 may also change along its length to maintain safe and constant stress levels at all sections. In this manner, the compliant link 10 can be modified suitable to the desired application based on its stiffness and the kinematic requirements of the suspension.

Figure 4:
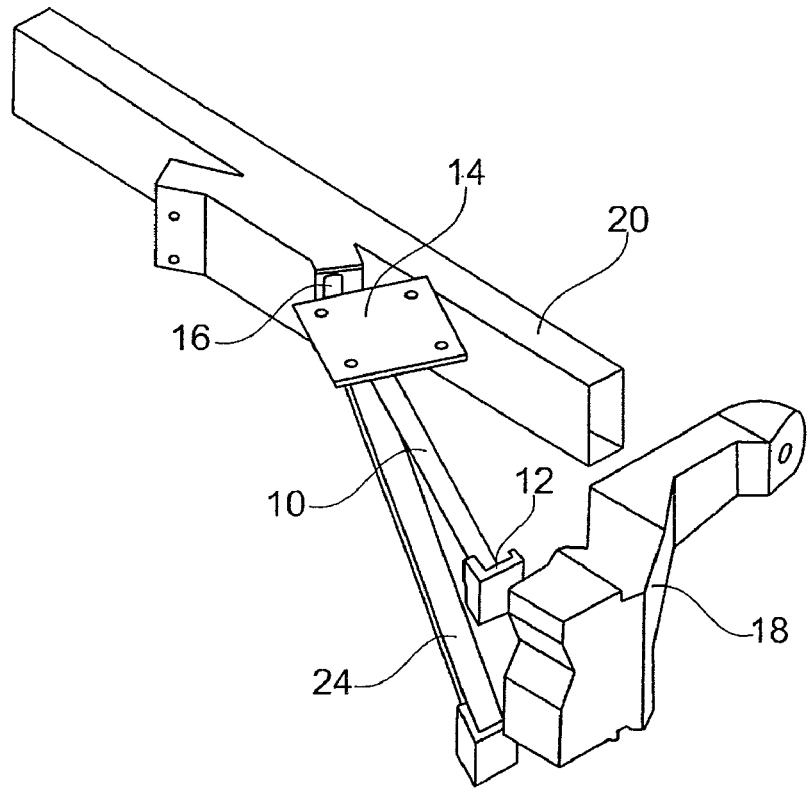
FIG. 4 is a first perspective view of a first embodiment of a vehicle suspension including the link according to FIG. 1.
Figure 5:
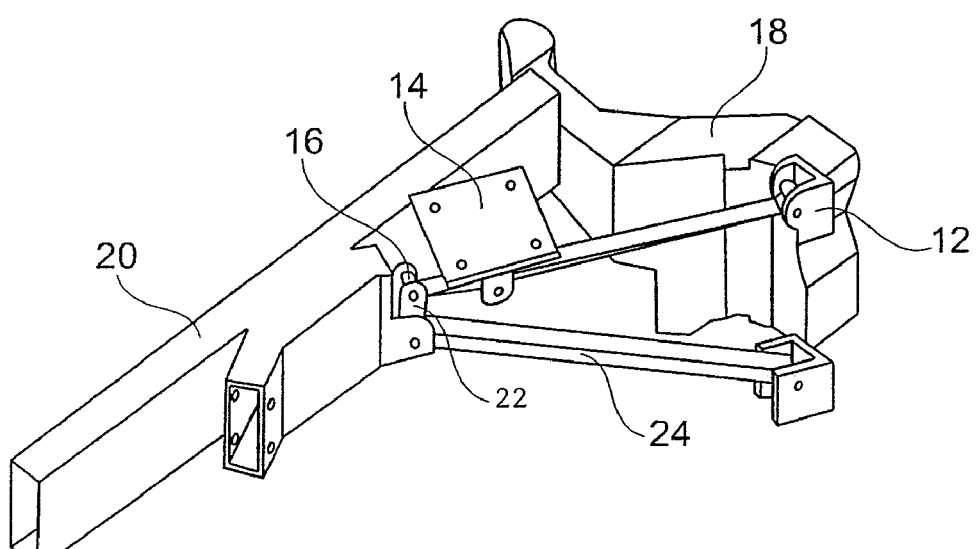
FIG. 5 is a second perspective view of the vehicle suspension according to FIG. 4.

As shown in FIGS. 4 and 5, the compliant link 10 is pinned at suspension point 12 in the inboard side of the wheel carrier 18, pinned to the fulcrum at an intermediate location at suspension point 14, and pinned to the shackle 22 at suspension point 16.

A second link 24 is provided, forming a rigid lower control arm. The link 24 is a kinematic link with bushings on either end of the link 24, with one end connected to the chassis 20 and the other end connected to the wheel carrier 18. Thus, the link 24 forms a lateral control arm.

The wheel carrier 18 is built with a longitudinal arm extending towards the front of the respective vehicle and housing the wheel carrier 18.

The shackle 22 is provided at the chassis connection end of the compliant link 10 to allow for elongation of the link 10 during vertical motions of the wheel carrier 18.

Known multi-link suspensions use three or more rigid links to provide kinematic guidance of a respective wheel, and include separate coil springs as energy storage members. The compliant link 10 replaces one or more rigid links of such a suspension. In doing so, the compliant link 10 contributes to both the kinematics and compliance of the suspension simultaneously.

FIGS. 6 to 9 show further embodiments of the compliant link 10 and its mounting in respective vehicle suspensions 26. In particular, in these embodiments, the link 10 is used as an upper transverse control arm in an independent rear suspension of an automobile. In this mounting, the compliant link 10 provides both the energy storage and guidance of a wheel 28 on its rim 30. The link 10 provides these two functions for each wheel 28, unlike conventional transverse leaf spring suspensions where motion of one wheel influences the motion of the other wheel.

Figure 6:
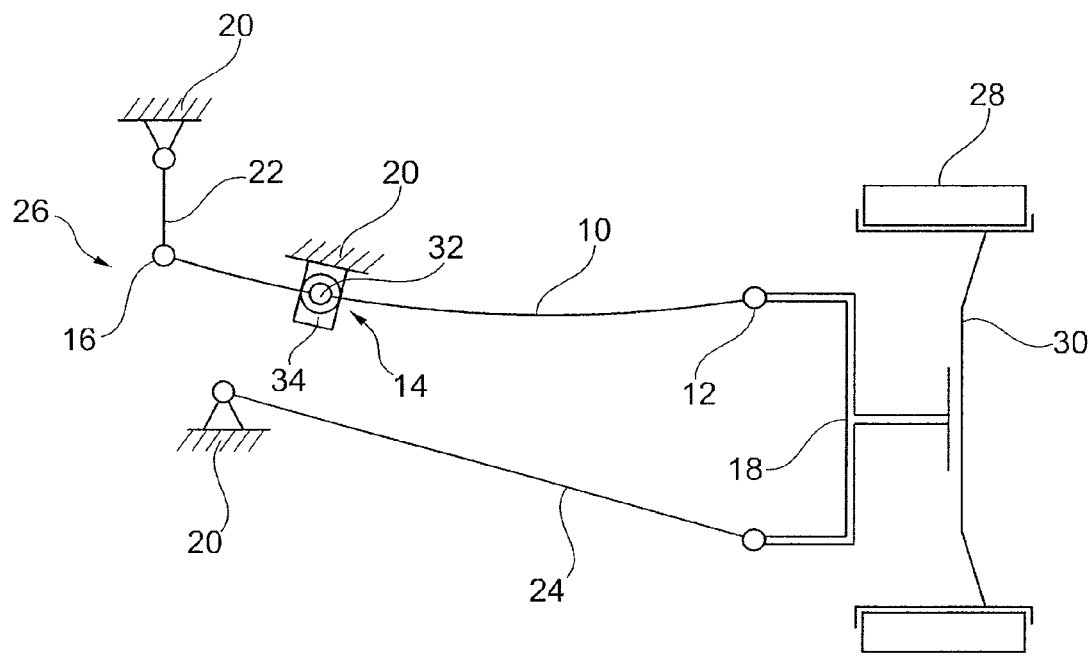
FIG. 6 is a schematic front view of a second embodiment of a vehicle suspension according to the invention.

In FIG. 6 an embodiment is depicted in which the second suspension point 14 is formed by a single bump 32 being fixed at the fulcrum of the link 10, and being encompassed by a suspension element 34 on each side of the link 10.

Figure 7:
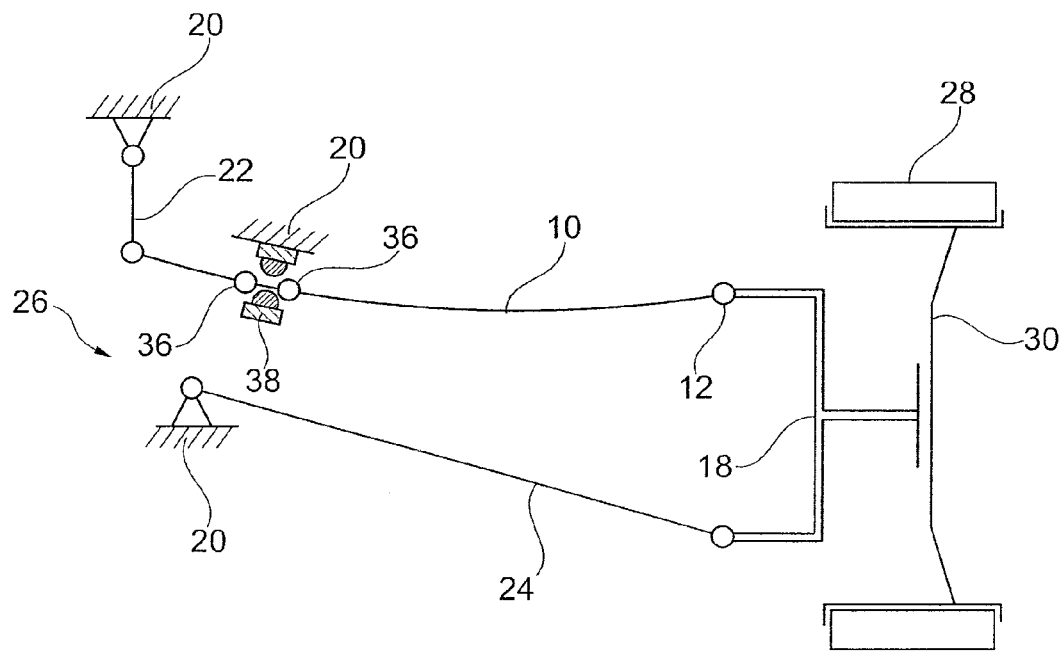
FIG. 7 is a schematic front view of a third embodiment of a vehicle suspension according to the invention.

FIG. 7 shows an embodiment in which the suspension point 14 is formed by two bumps 36 having a single suspension element 38 between the two bumps 36. The single suspension element 38 is carrying the link 10.

Figure 8:
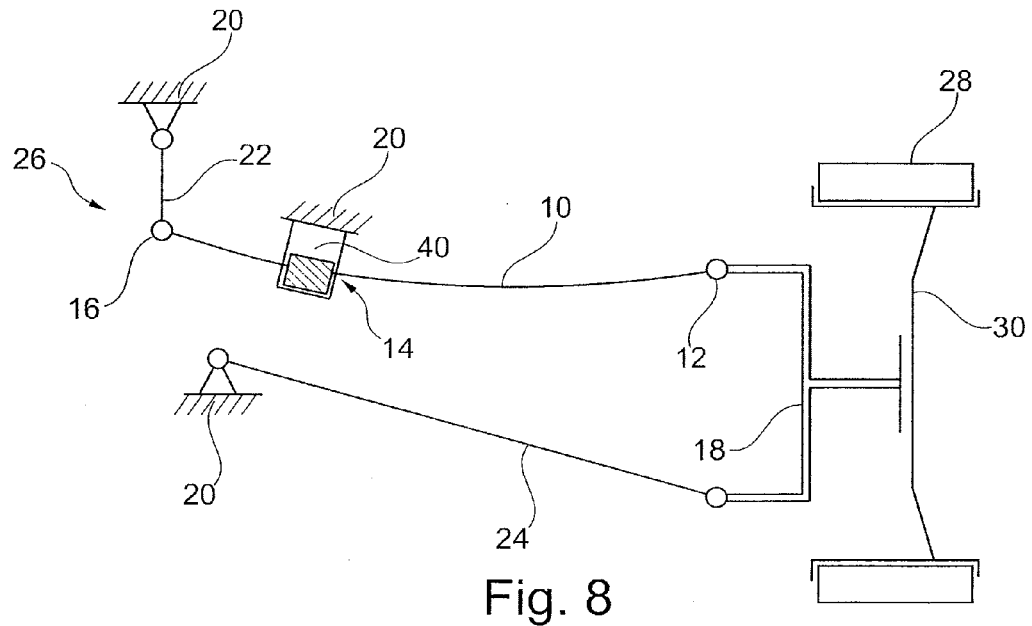
FIG. 8 is a schematic front view of a forth embodiment of a vehicle suspension according to the invention.

In the embodiment of FIG. 8, the link 10 is clamped at its suspension point 14 by a suspension element 40.

Figure 9:
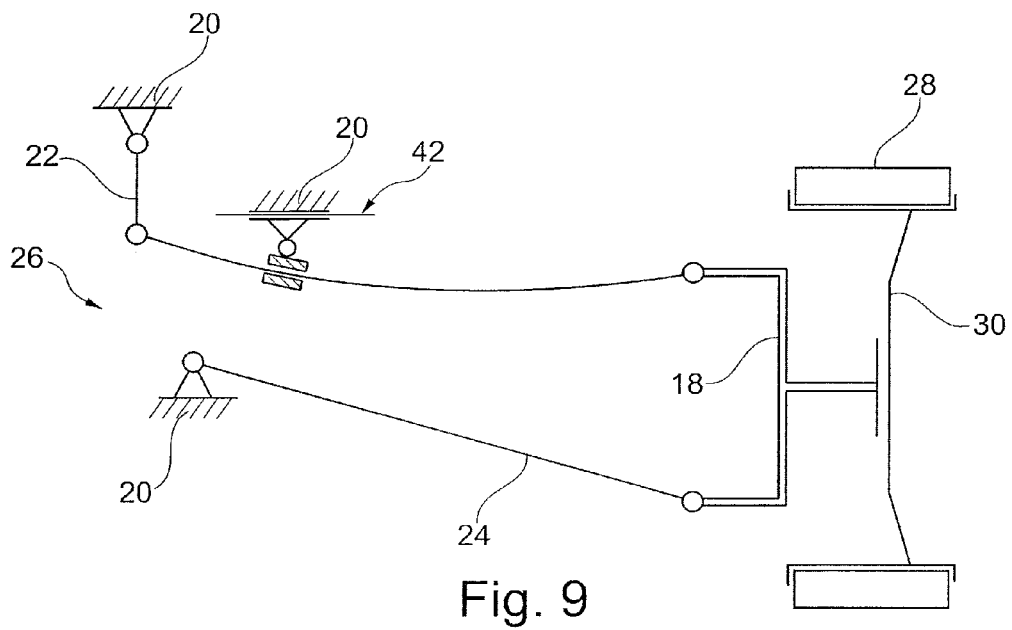
FIG. 9 is a schematic front view of a fifth embodiment of a vehicle suspension according to the invention.

Finally, referring to FIG. 9, an embodiment of a vehicle suspension 26 is depicted in which a fixation 42 of the second suspension point 14 at the rigid chassis 20 is displaceable.

| Table of Reference Symbols | |
|---|---|
| 10 | Link |
| 12 | Suspension point |
| 14 | Suspension point |
| 16 | Suspension point |
| 18 | Wheel carrier |
| 20 | Chassis |
| 22 | Shackle |
| 24 | Second link |
| 26 | Vehicle suspension |
| 28 | Wheel |
| 30 | Rim |
| 32 | Bump |
| 34 | Suspension element |
| 36 | Bump |
| 38 | Suspension element |
| 40 | Suspension element |
| 42 | Fixation |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An upper transverse control arm component of a vehicle suspension for use with a rigid chassis of a vehicle including a wheel carrier and a shackle, comprising:

an elastic link comprising three suspension points, a first point being adapted to be pivotally connected to the wheel carrier of the vehicle to pivot about a substantially longitudinal axis of the vehicle, a second point being adapted to be pivotally connected to the rigid chassis of the vehicle, and a third point being adapted to be pivotally connected to the shackle; and wherein the shackle pivotally connects the third point to the rigid chassis.

2. The component according to claim 1, wherein the link is an elongated leaf element, the first point being located at a first end of the elongated leaf element, the second point being located along a longitudinal extent of the elongated leaf element between ends thereof, and the third point being located at a second end of the elongated leaf element.

3. The component according to claim 1, wherein each of the first, second and third points are at a fixed position on the link.

4. The component according to claim 2, wherein each of the first, second and third points are at a fixed position on the link.

5. A vehicle suspension, comprising:
a rigid chassis of a vehicle;
a wheel carrier of the vehicle;
a shackle;
an elastic link comprising three suspension points, a first point being pivotally connected to the wheel carrier, a second point being pivotally connected to the rigid chassis, and the third point being pivotally connected to the shackle;
wherein the elastic link operatively forms an upper transverse control arm of the vehicle suspension,
wherein the shackle pivotally connects the third point to the rigid chassis.

6. The vehicle suspension according to claim 5, wherein the link is an elongated leaf element, the first point being located at a first end of the elongated leaf element, the second point being located along a longitudinal extent of the elongated leaf element between ends thereof, and the third point being located at a second end of the elongated leaf element.

7. The vehicle suspension according to claim 5, wherein each of the first, second and third points are at a fixed position on the link.

8. The vehicle suspension according to claim 6, wherein each of the first, second and third points are at a fixed position on the link.

9. The vehicle suspension according to claim 5, further comprising:
a second link, the second link being pivotally connected at one end to the wheel carrier and at a second end to the rigid chassis.

10. The vehicle suspension according to claim 6, further comprising:
a second link, the second link being pivotally connected at one end to the wheel carrier and at a second end to the rigid chassis.

11. The vehicle suspension according to claim 7, further comprising:
a second link, the second link being pivotally connected at one end to the wheel carrier and at a second end to the rigid chassis.

12. The vehicle suspension according to claim 9, wherein said elastic link and said second link are part of a parallelogram guiding the wheel carrier relative to the chassis, the elastic link being an upper lateral arm of the parallelogram and the second link being a rigid lower arm of the parallelogram.

13. The vehicle suspension according to claim 11, wherein said elastic link and said second link are part of a parallelogram guiding the wheel carrier relative to the chassis, the elastic link being an upper lateral arm of the parallelogram and the second link being a rigid lower arm of the parallelogram.

14. The vehicle suspension according to claim 5, wherein the second point comprises two bumps fixed at the elastic link, at least one suspension element holding the link by carrying the link between the two bumps.

15. The vehicle suspension according to claim 12, wherein the second point comprises two bumps fixed at the elastic link, at least one suspension element holding the link by carrying the link between the two bumps.

16. The vehicle suspension according to claim 5, wherein the second point comprises a single bump fixed at the elastic link, at least one suspension element holding the link by encompassing the single bump.

17. The vehicle suspension according to claim 12, wherein the second point comprises a single bump fixed at the elastic link, at least one suspension element holding the link by encompassing the single bump.

18. The vehicle suspension according to claim 5, wherein the second point comprises at least ones suspension element operatively configured to clamp the elastic link.

19. The vehicle suspension according to claim 5, further comprising a fixation device for fixing the second point at the rigid chassis, the fixation device being displaceable at the rigid chassis.

20. The vehicle suspension according to claim 6, further comprising a fixation device for fixing the second point at the rigid chassis, the fixation device being displaceable at the rigid chassis.

* * * * *